(12) United States Patent
Hildebrandt (10) Patent No.: US 6,345,945 B1
(45) Date of Patent: Feb. 12, 2002

(54) HOLE PLUG

(76) Inventor: David J. Hildebrandt, 165 Josselyn La., Woodside, CA (US) 94062

(*) Notice: Subject to any disclaimer, the term of this patent is extended or adjusted under 35 U.S.C. 154(b) by 0 days.

(21) Appl. No.: 09/639,518

(22) Filed: Aug. 15, 2000

Related U.S. Application Data

(62) Division of application No. 09/172,752, filed on Oct. 14, 1998, now Pat. No. 6,102,641.

(51) Int. Cl.[7] ............................ F16B 33/00; F16B 43/02
(52) U.S. Cl. ...................... 411/369; 411/340; 411/344; 411/539
(58) Field of Search ................................. 411/369, 340, 411/344, 345, 371.1, 542, 539; 138/97, 98

(56) References Cited

U.S. PATENT DOCUMENTS

| | | | | |
|---|---|---|---|---|
| 2,360,395 A | * | 10/1944 | Byron | 411/340 |
| 2,643,904 A | * | 6/1953 | Wehmanen | 411/542 |
| 4,907,911 A | * | 3/1990 | Rodriguez et al. | 138/98 X |
| 4,971,502 A | * | 11/1990 | Oh | 411/344 X |
| 5,044,854 A | * | 9/1991 | Oh | 411/344 |
| 6,102,641 A | * | 8/2000 | Hildebrandt | 411/344 X |

* cited by examiner

Primary Examiner—Neill Wilson (74) Attorney, Agent, or Firm—Carol D. Titus; James J. Leary (57) ABSTRACT

A hole plug and method of installing the hole plug to seal and repair a hole in a wall of a pipeline, tank or other physical structure is provided. The hole plug has a bolt with a bolt head and a threaded shank, where two or more adjacent notched washers, one or more sealing washers and an exterior washer are secured about the threaded shank and between the bolt head and a threaded nut. The present invention includes an internal sealing washer and/or an external sealing washer. The sealing washers and the exterior washer are selected to provide a surface area larger than the hole. The hole is prepared by establishing a solid, clean edge. The bolt head, a length of the threaded shank, the notched washers and an optional internal sealing washer, are passed from the exterior side of the wall and through the hole. Insertion of the notched washers is accomplished by tipping the washers at an angle to the wall and rotating the washer through the hole. This method of insertion allows a larger size washer to pass through the hole. The notched washers are then rotated separately about the threaded shank to match alignment holes of the notched washers to one or more alignment teeth of the bolt head, and to establish a combined pressure surface larger than the hole. The nut is next tightened along the threaded shank and towards the hole and the bolt head to force the exterior washer against the exterior side of the wall, to force the optional external sealing washer against the exterior of the wall and to force the notched washers and the optional internal sealing washer against the interior side of the wall.

23 Claims, 9 Drawing Sheets

HOLE PLUG

CROSS-REFERENCE TO OTHER APPLICATIONS

This application is a divisional of U.S. patent application Ser. No. 09/172,752, filed Oct. 14, 1998, now U.S. Pat. No. 6,102,641, issued Aug. 15, 2000.

BACKGROUND OF THE INVENTION

1. Field of the Invention

The present invention relates to methods and devices used to repair damaged pipelines, walls of physical structures and holding tanks. More particularly, the present invention relates to the field repair and patching of undesirable ruptures, holes or punctures in a previously constructed and/or installed wall of a pipeline, tank or other physical structure.

2. Description of Related Art

The repair, and especially the field repair, of punctures in pipelines, storage or chemical processing tanks, and other physical structures is a matter of considerable import in numerous industrial and domestic settings, e.g. septic tanks and petroleum pipelines. The approach by a repair technician to the puncture is often limited to an interior side of the puncture, and a timely repair is best executed from an exterior side only. Welding tools and techniques are sometimes effective, but only where the pipeline, structure or tank is made of a relatively few appropriate materials, e.g. steel or aluminum. Welding can be dangerous to apply, requires rigorous technical training and expensive tooling, can cause obvious and non-obvious structural damage to the pipeline, structure or tank, is difficult to monitor for quality and may be difficult to perform in remote areas away from required facilities.

A variety of expanding element assemblies, generally referred to as molly bolts, are used to establish an opposing surface against an interior side of a wall. The molly bolt includes an expanding element and a threaded bolt, where the expanding element is initially passed through a puncture and the threaded bolt is then rotatably driven into the expanding element. It is intended by the design of the molly bolt that the shape of the expanding element changes to form a surface as the threaded bolt is advanced into the expanding element and through the puncture, and where a perimeter of the formed surface grows larger than the puncture. The perimeter of the formed surface is then forced against the interior side of the pipeline or wall as a result of the advance of the bolt into the expanding element. Molly bolts are often used to establish load bearing anchor points in drywall and other materials.

Molly bolts do not establish sealing surfaces of continuous perimeter around a puncture, hole or rupture. Molly bolts are, therefore, not useful as hole plugs to repair and seal holes in physical structures, such as tanks and pipelines, that process, contain or store chemicals or materials, to include vapors or liquids.

There is, therefore, a long felt need in various domestic and industrial arts to provide a widely applicable and easily attached hole plug of simple and inexpensive construction and that requires access to only one side of the hole for installation.

OBJECTS OF THE INVENTION

It is therefore an object of the present invention to provide an apparatus to repair a rupture, hole or puncture in a wall of a pipeline, a tank or other physical structure, optimally in a permanent and leak-proof manner;

It is another object of the present invention to provide an apparatus constructed with simple and inexpensive materials to repair a rupture, hole or puncture of a wall of a pipeline, a tank or other physical structure;

It is an additional object of the present invention to provide an apparatus to repair ruptures, holes and punctures in a wall of a pipeline, tank or other physical structure, where the apparatus is usable with a wide variety of pipeline, tank and structural materials;

It is a further object of the present invention to provide an apparatus and method of installation of the apparatus that enables the repair of a rupture, hole or puncture of a wall of a pipeline, tank or other physical structure where access by a repair technician to only one side, or an exterior side, of the wall is desirable, possible or required;

It is still another object of the present invention to provide an apparatus and a method to effectively repair a rupture, hole or puncture in a wall of a pipeline, tank or other physical structure without the use of high temperature tools, such as welding equipment, and whereby the repair is executed at an ambient temperature, thereby reducing a risk of uncontrolled fire and/or of heat induced structural damage of the wall;

It is yet a further object of the present invention to provide an apparatus that is manufacturable in a variety of sizes, whereby an appropriately sized embodiment is selected and used in view of the magnitude of the specific rupture, hole or puncture under repair; and It is still another object of the present invention to provide an apparatus that is quickly executable in a field environment and enables a rapid repair of ruptures, holes or punctures in a wall of a pipeline, tank or other physical structure.

SUMMARY OF THE INVENTION

These and other objects and advantages of the present invention are achieved by providing an apparatus and method to repair ruptures, holes and punctures through a wall of a pipeline, tank or other physical structure. Generally speaking, the present invention provides a set of apertured washers secured about a threaded shank of a bolt and captured between a head of the bolt and a threaded nut. The set of washers includes at least two notched washers, a sealing washer and an exterior washer. The aperture of each washer is dimensioned to allow passage of the threaded shank through each washer. In operation, all of the washers are located about the threaded shank of the bolt. The set of washers is positioned along the threaded shank, in order from the head of the bolt to the nut as follows: a first notched washer, a second notched washer followed by any additional washers, one or two sealing washers and the exterior washer.

The method of the present invention includes the steps of identifying a hole for repair and optionally preparing the hole, by cleaning and filing for example, to create a prepared hole having a solid edge with a substantially flat interior side and a substantially flat exterior side to which the present invention may be secured. The size and shape of the hole may be increased to form a prepared hole in order to allow a passage through the wall of the head of the bolt, notched washers and optionally an internal sealing washer. The method of the present invention allows for the preparation and/or selection of varying sizes of the elements of certain alternate preferred embodiments, where a best fit preferred embodiment may be especially dimensioned and prepared, or selected from an inventory of preferred embodiments to most closely match the size and shape of the prepared hole.

The size of the prepared hole allows passage of the bolt head, the washers and the optional internal sealing washer. The prepared hole can be oval in shape with a minimum first axial dimension that allows passage of the bolt head and a minimum second axial dimension that allows passage of the washers. Although the optional internal sealing washer, and/or an optional external sealing washer, present a sealing surface area that is larger than the prepared hole, the internal sealing washer is elasticity deformable to allow bending and compressing of the internal sealing washer during insertion through the hole.

The preferred embodiment of the notched washers is shaped as a flattened sheet with a circular internal aperture and an essentially circular periphery. The periphery of the preferred embodiments is formed as a circle cut along a chord and with the chordal segment removed. The resultant periphery therefore present a major axis and a minor axis, where the major axis is longer than the minor axis. In certain preferred embodiments, the chordal cut passes through the internal aperture and creates an open gap of the internal aperture. This gap is smaller in length than the diameter of the bolt shank in order maintain the captivation of the notched washer by the bolt shank. The notched washers may be identical within a particular embodiment in order to reduce manufacturing costs.

In some embodiments, the face of the washers may have other contours to properly fit the surface of the tank. For example, if the curved wall of a cylindrical tank were being patched, the face of the washers may be curved so that, when in place, the curved face washers will press evenly against the wall of the tank. Other shapes, such as compound curves, angles, bends, or any other practical or desirable shape, are also envisioned.

The peripheries of the notched washers of various alternate embodiments are shaped in other forms than circular and that present a major axis and a minor axis, e.g. rectangular, oval and oblong shapes. The minor axis allows the notched washer to be inserted through a hole where the hole has a smaller diameter than the length of the major axis. After insertion, the preferred embodiment provides two or more notched washers that are then fanned out to create a circular combined periphery with a diameter equal to the length of the major axis. Alternate notched washer shapes and designs will create differently shaped combined peripheries.

The present invention may also be used to secure large openings by using a plurality of sets of: washers, sealing washer(s), nut, and bolt. In this case, a plate or other larger object may be placed covering the hole, the plate would then be secured around the opening using as many of the hole plugs of the present invention as is necessary or desired to successfully secure the plate. To ensure proper sealing, a resilient member may be added between the plate and the wall around the hole.

The head of the bolt and the notched washers are first inserted through the prepared hole from an exterior side and beyond an interior side of the wall. The method of the present invention includes an insertion of each notched washer through the prepared hole, where the size and shape of the prepared hole allow this insertion, and where the size and shape of the prepared hole obstruct a passage of the notched washers through the prepared hole when the notched washers have been inserted as described and are fanned out to form a pressure surface. Each notched washers is notched prior to installation in order to reduce their individual maximum surface areas and thereby ease passage of each notched washer through the prepared hole. In addition, the optional internal sealing washer may be passed through the hole and beyond the interior side of the wall. The optional internal sealing washer is constructed of material and formed by design to flexibly and elastically deform during transit through the prepared hole. Before or after insertion of the internal sealing washer, the notched washers are fanned out to form an internal pressure surface for pressing either directly against the interior side of the wall or optionally for pressing the internal sealing washer against the interior side of the wall. The threaded nut, remaining located exterior to the hole, is next advanced along the threaded shank of the bolt and towards the bolt head. This advancement of the threaded nut drives the exterior washers, if used, towards the exterior side of the wall whereby the optional external sealing washer is pressed against the exterior side of the wall.

When fully installed, those preferred embodiments which include the insertion of the optional internal sealing washer through the hole, press the head of the bolt against the fanned out notched washers, whereby the pressure surface of the notched washers is forced against the internal sealing washer and the internal sealing washer is thereby pressed against the interior side of the wall. In those preferred embodiments of the present invention which do not include the placement of the optional internal sealing washer against the interior of the wall, the pressure surface formed by the fanned out notched washers is pressed directly against the interior of the wall by the bolt head during and after installation, and the threaded nut threadably engages the threaded shank of the bolt and drives the exterior washers towards the exterior side of the wall. The exterior washers thereby presses the external washer against the exterior side of the wall. The pressure of the threaded nut against the exterior washer and the pressure of the bolt head against the fanned out notched washers insure that the external sealing washer and/or the internal sealing washer are sufficiently forced against the exterior side and/or the interior side of the wall to effectively seal the hole.

Certain alternate preferred embodiments of the present invention are configured with an alignment tooth or teeth on the bolt head and matching alignment receivers on the notched washers whereby the pressure surface area formed thereof is repeatably and reliably formed by the fanned out washers.

Certain preferred embodiments of the present invention further comprise one or more multi-plane washers, where each multi-plane washers includes a flat intermediate surface and a flat raised surface. The raised surface aligns with one or more notched washers and/or one or more additional multi-plane washers to create a uniform pressure surface plane for pressing against either the internal sealing washer or the interior side of the wall. When the multi-plane washer is pressed along the axis of the threaded shank and towards the interior side of the wall, the intermediate surface plane consequently presses one or more notched washers and/or additional multi-plane washers from behind the uniform pressure surface. The multi-plane washer thereby combines with and stabilizes a fanned out formation of one or more notched washers and/or one or more multi-plane washers into the uniform pressure surface plane and thus supports the sealing of the hole. This style of washer may or may not include alignment holes.

Any excess length of the threaded shank protruding outwards from the threaded nut after installation of the present invention may be cut off or removed. The removal of some or all excess length may be desired for safety reasons and to eliminate an obstruction point on the exterior of the wall. In certain applications where tampering or unauthorized disassembly of the installed hole plug is to be discouraged, specialized locking or securing nuts, or nuts with locking elements, may be used to hamper or prevent improper removal of the hole plug. Locking elements such as teflon bands and/or engaging flanges that bite into the wall are included in the design of locking or securing nuts as locking elements in various preferred embodiments of the present invention. Certain alternate preferred embodiments of the present invention employ separate locking washers as locking elements. Glues or adhesive substances such as lock-tite may also be employed to more strongly seal the hole plug in place and impede removal.

The present invention thus provides a widely applicable, low-cost, rapidly employed and easy to install hole plug of varying model sizes that requires access by the installation technician to only one side, i.e. the exterior side, of a wall of a pipeline, tank or other physical structure.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein.

Figure 1:
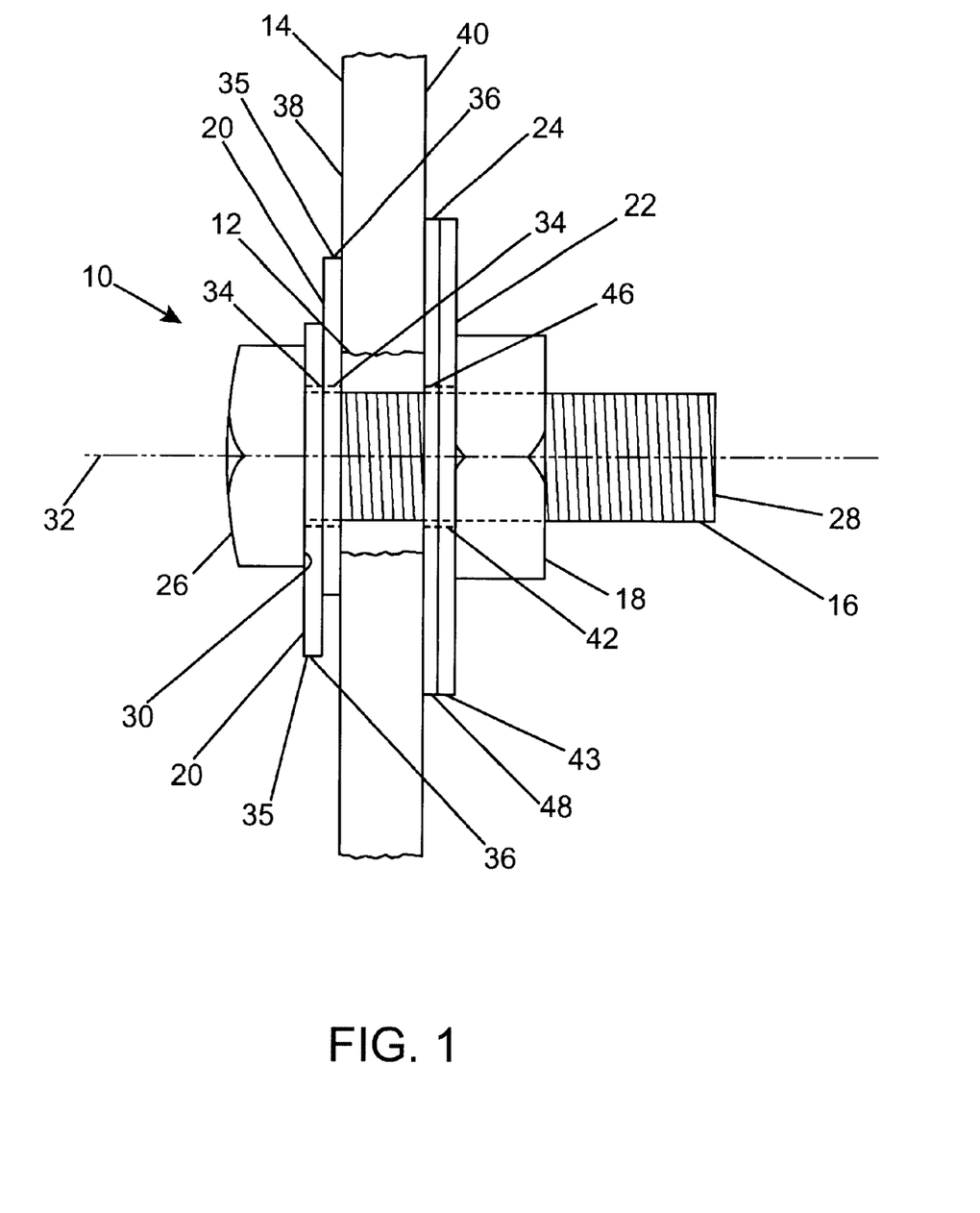
FIG. 1 is a side view of a hole plug installed about a hole in a wall.

Referring now to the drawings, wherein like reference numerals describe like elements, there is shown in FIG. 1 a hole plug 10 installed to plug a hole 12 in a wall 14. The hole plug 10 is shown to include a threaded bolt 16, a threaded nut 18 and a series of washers 20, 22, 24. The bolt 16 includes a bolt head 26 and a threaded shank 28. A clamping surface 30 extends outwards from the circumference of the threaded shank 28 and in a plane roughly perpendicular to an axis 32 of the threaded shank 28. The bolt head 26 shown has a standard hexagonal head 26; however, since for most uses, the user tightens down the nut 18, not bolt head 26, the head 26 maybe any convenient or utilitarian shape. For example, if the hole plug 10 were installed on a pipe with fluid flowing by, a low profile and/or rounded head with low fluid resistance may be preferred.

Figure 3:
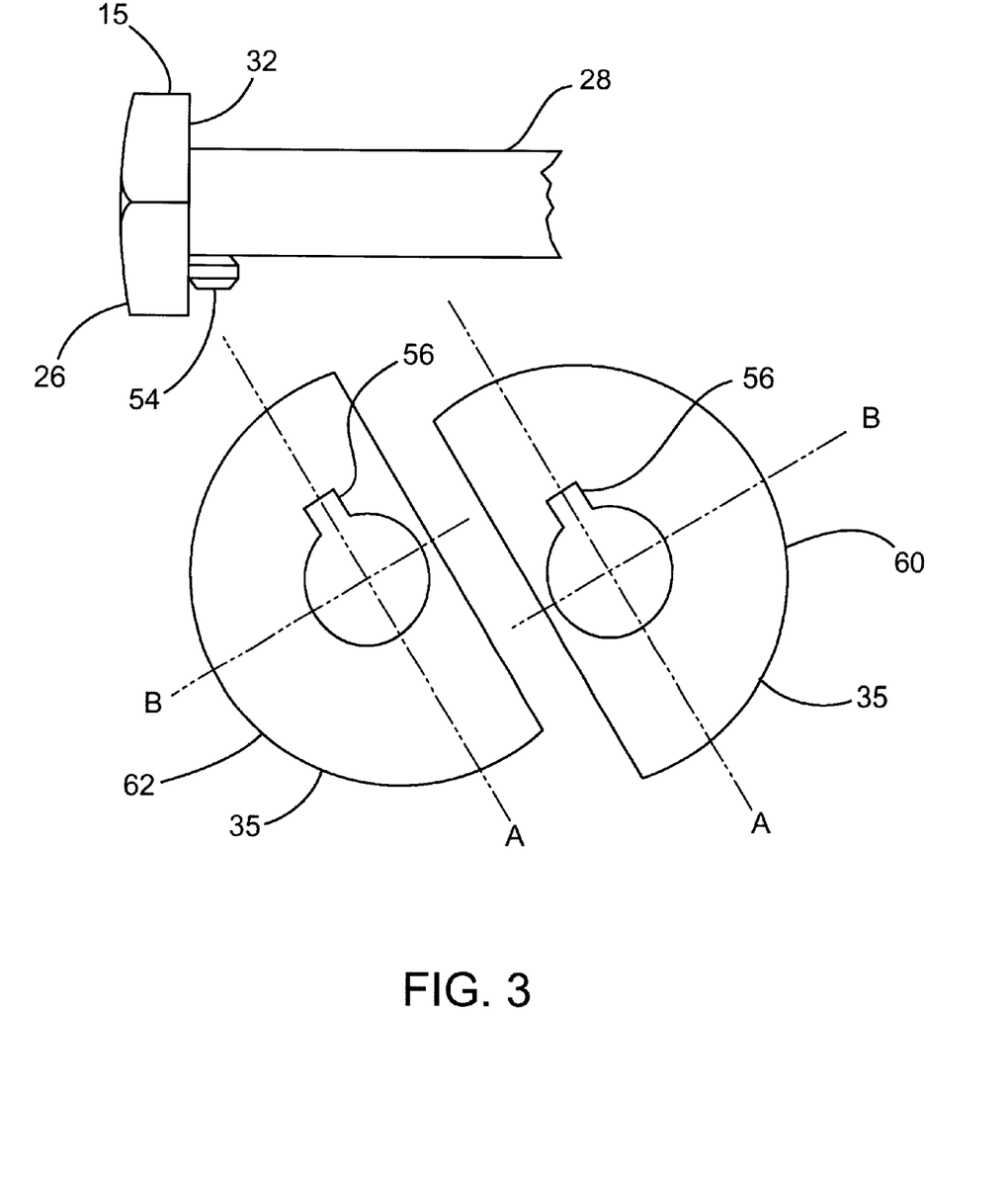
FIG. 3 is an exploded view of the hole plug of FIG. 1 showing an alignment tooth of the bolt and alignment holes of the notched washers.

As shown in FIG. 3, a pair of notched washers 20 each have a major axis A, a minor axis B, an internal aperture 34 through which the threaded shank 28 passes and an arcuate periphery 35. The apertures 34 of each notched washer 20 are purposefully formed to prohibit passage of the clamping surface 30, and, therefore the bolt head 26, through the notched washers 20. The notched washers 20 are oriented, or fanned out, to establish a combined periphery 36 formed of the arcuate peripheries 35 and large enough to inhibit the passage of the notched washers 20, when fanned out, through the hole 12. The bolt head 26 and the clamping surface 30 are used to press the fanned out notched washers 20 firmly against the interior side 38 of the wall 14.

The threaded nut 18 is sufficiently advanced along the threaded shank 28 to drive the exterior washer 22 against the external sealing washer 24, and thereby press the external sealing washer 24 solidly against the exterior side 40 of the wall 14. The exterior washer 22 has a central aperture 42 and an external perimeter 43. The central aperture 42 is sufficiently large to allow the passage of the threaded shank 28 and sufficiently small to inhibit a passage of the threaded nut 18 through the exterior washer 22. The external perimeter 43 is large enough to prevent passage of the exterior washer 22 through the hole 12.

The external sealing washer 24 has an opening 46 and an outward perimeter 48. The opening 46 snugly fits around the threaded shank 28 and allows translation of the external sealing washer 24 about the threaded shank 28 and along the axis 32 of the threaded shank 28.

The bolt 16, the threaded nut 18, the notched washers 20 and the exterior washer 22 are formed of a strong and rigid material such as steel, a metal or a metal alloy, a plastic or a plastic composite, or other suitable material known in the art. The external sealing washer 24 is made of a strong and flexible material such as natural or synthetic rubber, neoprene or other suitable material known in the art. The material and design of the external sealing washer 24 is sufficiently solid and flexible to establish an effectively tight seal of the hole 12 when the external sealing washer 24 is firmly driven or held against the exterior side 40 of the wall 14. The material and design of various sealing washers 24 of certain preferred embodiments of the present invention are also selected with consideration of potential chemical interaction between a material forming the wall 14 and/or any material, e.g. petroleum or septic fluids, that the wall 14 is expected to contain.

In environments where further corrosion or other degradation of the wall 14 being patched is unlikely, or in cases where a temporary patch is sufficient, or if the additional stability is unnecessary, a single notched washer 20 may be used. Although not necessary, the single notched washer 20 would preferably be turned so that its major axis A spans across the shortest axis of the hole 12, thereby providing the most stable and durable support possible.

One embodiment of the present invention incorporates an anode as a part of the bolt 16. The entire bolt 16, or a portion of the head 26 may be made of zinc, aluminum or other similar material which may be used in tanks of galvanized steel. The anode material would necessarily be in electrical contact with the tank material, so the sealing washer 24 may be omitted or other electrical contact may be made.

In some cases, the hole plug system 10 may be used in situations where a low-voltage charge is in use to deter corrosion. If the low-voltage charge is to be used to protect the hole plug system 10 from corrosion as well, electrical contact must be made between the system 10 and the wall 14. One method of insuring contact is omission of the sealing washer(s) 24 on the interior or exterior of the wall 14. The corresponding side of the wall 14 may also be cleaned to provide the best possible electrical contact.

Particular situations may also dictate the material for the parts. For example, some situations will require materials with certain properties such as heat resistance, corrosion resistance chemically immunity from the material of the wall or surroundings and/or the material being stored within the tank or other body.

Figure 2:
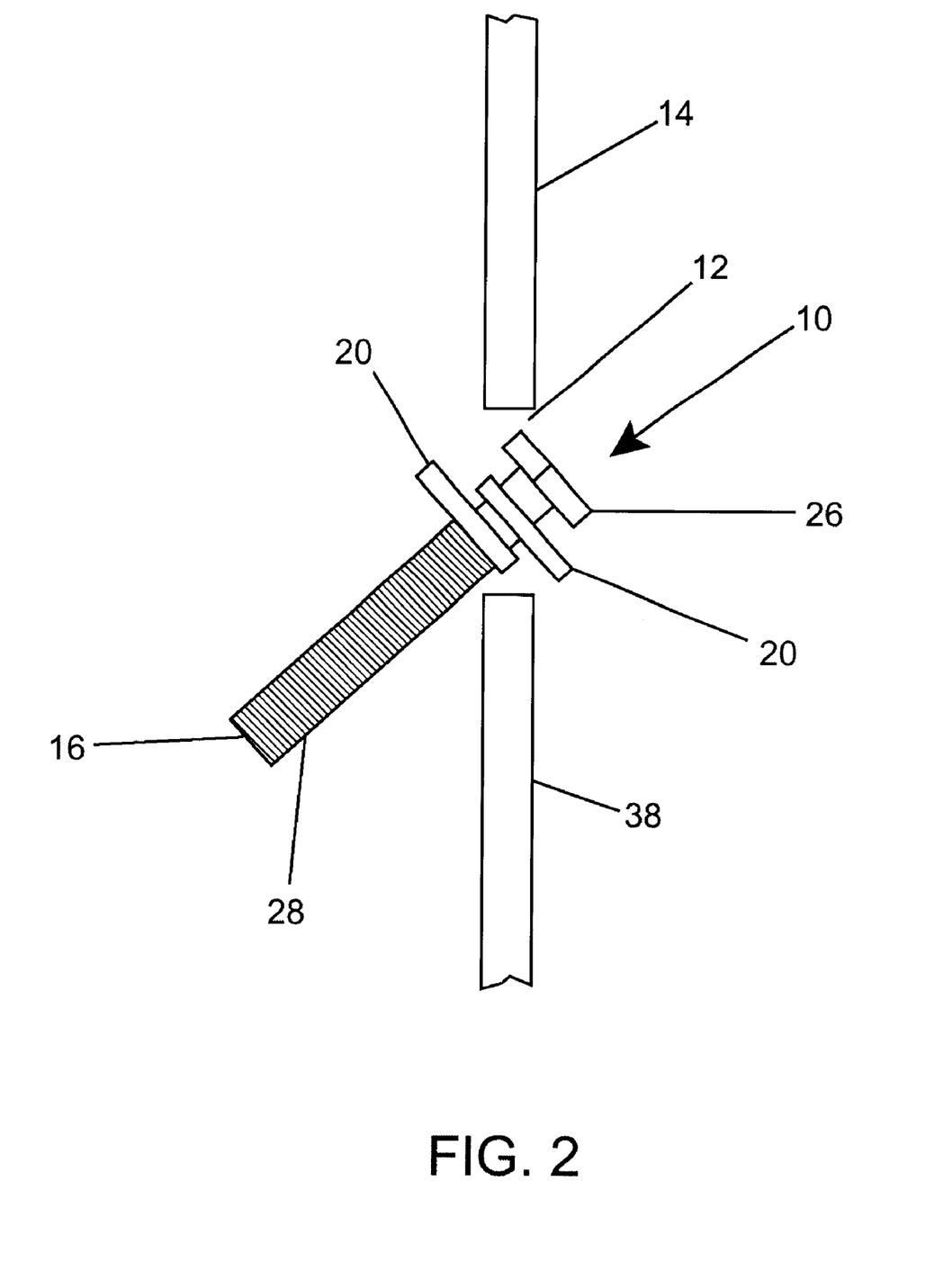
FIG. 2 is a depiction of a step of an installation process of the hole plug of FIG. 1 onto the wall.
Figure 10:
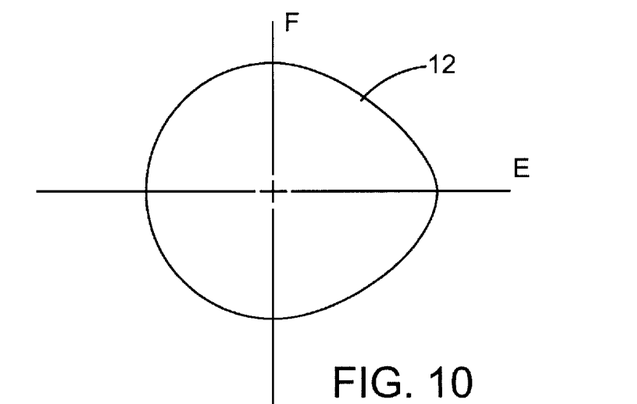
FIG. 10 is a front view of a hole to be plugged.

Referring now to FIG. 2, a step of an installation process of the hole plug 10 of FIG. 1 onto the wall 14 is illustrated. The notched washers 20 are placed around the shank 28 of the bolt 16 and oriented to present a reduced or minimal surface area to the hole 12. The bolt head 26 and the pair of notched washers 20 are slipped through the hole 12 and beyond the interior side 38 of the wall 14. The notched washers 20 are rotated about the threaded shank 28 during the passage of the notched washers through the hole 12. The notched washers 20 are then fanned out, as shown in FIG. 1, to establish the combined periphery 36 whereby removal of the notched washers 20 through the hole 12 is inhibited. Where the surface around the hole 12 is not secure or may not sufficiently engage the hole plug 10, the surfaces of the washers 20 may be roughened or otherwise prepared to ensure adequate engagement with the surrounding wall 14. Alternately, if accessible, the surface of the surrounding wall 14 may also be roughened or prepared to increase the engagement. In order to insert the hole plug 10 through smaller holes 12, the washers may be inserted singly and rotated through the hole which will be described in more detail later. For these applications, the hole may be shaped more in a teardrop configuration as shown in FIG. 10. After the notched washers 20 are through the hole 12, the internal and/or external sealing washers 24, exterior washer 22, if used, and nut 18 are applied.

Referring now to the Figures and especially to FIG. 3, wherein an alignment tooth 54 of the bolt 16 of FIG. 1, and the alignment receivers 56 of the notched washers 20 are shown. The alignment tooth 54 is located on the threaded shank 28 and proximate to the clamping surface 32. The first notched washer 60 and the second notched washer 62 each have one alignment hole 56. During insertion through the hole 12 of FIG. 1, the alignment tooth 54 may optionally be placed within the alignment hole 56 of the first notched washer 60. This placement of the alignment tooth 54 captivates the notched washer 60 and allows the user to twist the bolt 16 by the shank 28 to rotate the washer 60 through the hole 12. Once inserted, the second notched washer 62 is rotated about the threaded shank 28. The second notched washer 62 is next repositioned such that the alignment tooth 54 is simultaneously seated within each of the alignment receivers 56 of the first and second notched washers 60, 62, whereby the first and second notched washers 60, 62 are fanned out to form the combined periphery 36 and inhibit the removal of the first and second notched washers 60, 62 through the hole 12.

The alignment tooth 54 is a part of the bolt 16 of FIG. 1 and may be made of the same material as the bolt 16 of FIG. 1 or be a soldered, welded or otherwise attached member.

In an alternate configuration, the alignment tooth may be formed as part of the shank 28 shape itself. For example, if one side of the shank were removed, the cross section of the shank 28 would be somewhat D-shaped. If the internal aperture 52 of the washer 20 were similarly D-shaped, this would prevent the washers 20 from rotating around the shank 28 of the bolt 16. Each washer 20 would be slid onto the bolt 16. After the bolt head 26 is inserted, the shank 28 is used to rotate each washer 20 through the hole 12. This configuration locks the washers 20 in their proper fanned out orientation.

For the maximum coverage with the minimum hole 12 size, the insertion process is critical. The optimal hole 12 shape is an oval or egg shaped hole 12 such as that shown in FIG. 10. If the notched washer 20 is inserted when parallel to the wall 14, then the hole 12 would need to be the at least same size as the washer 20. However, if the washer 20 is inserted when perpendicular to the hole 12, then the major axis E of the hole 12 could be just larger than the minor axis B of the washer 20. Since the washer 20 needs to be around the shank 28 of the bolt 16, then the washer 20 can not reasonable be perpendicular to the wall 14 during insertion. However, if the washer 20 is tipped, the major axis E of the hole 12 can be very close to the size of the minor axis B of the washer 20 and still allow the user to insert the necessary parts as follows. First, the bolt head 26 is tipped and slid though the hole 12. The notched washer 20 is slid onto the shank 28 of the bolt 16 and tipped. The flat side of the notched washer 20 is approximately aligned with the major axis E of the hole 12. One corner of the flat side is then slipped through the hole 12. The washer 20 is fed through the hole 12 by holding the approximate center of the flat side against the side of the opening and rotating the remainder of the washer 20 through the hole 12. Then, the second notched washer 20 is inserted by the same method. After the notched washers 20 are inserted, the bolt 16 is rotated until the alignment tooth 54, if present, engages the alignment receivers 56 of the notched washers 20. If an internal sealing washer 24 is used, it may be deformed and forced through the hole 12. The external parts are then applied and secured. As an example of the benefit of this method, a hole 12 with a major axis E measuring approximately 0.780 inches and a minor axis F measuring approximately 0.570 inches allowed installation of a system 10 having a bolt 16 with a 0.5 inch bolt head 26 and a ⅜ inch shank 28 and two notched washers 20 having major axes A of 1.0 inches and minor axes B of 0.765 inches. When centered and arrayed, the notched washers 20 extend beyond the periphery of the hole 12 by at least 0.11 inches in all directions.

Figure 4:
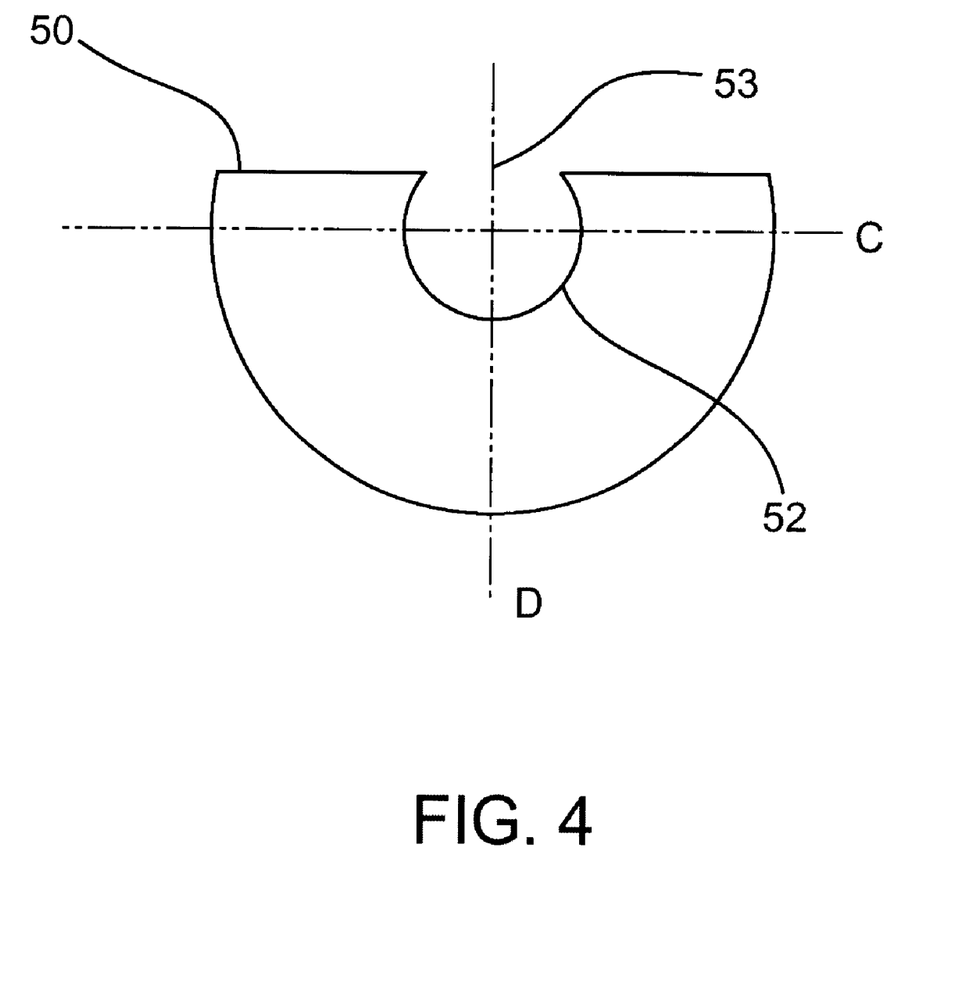
FIG. 4 is a front view of an alternate design of a notched washer.

Referring now to the Figures and especially to FIG. 4, wherein an alternate design of a notched circular washer 50 is shown. The alternate notched washer 50 of FIG. 4 includes a major axis C and a minor axis D. The alternate notched washer 50 includes an internal aperture 52 that includes an open segment 53 whereby the notched washer 50 of FIG. 4 does not fully surround the threaded shank 28 of the bolt 16. The reduction of length of the minor axis D of the alternate notched washer 50, in comparison to the minor axes B of the notched washers 20 of FIGS. 1 and 2, allows the insertion of the alternate notched washer 50 in combination with the bolt 16 through a hole of smaller dimension than required for the insertion of the notched washers 20 of FIGS. 1 and 2 in combination with the bolt 16.

The notched washer 50 of FIG. 4 is made of sufficiently strong material, such as metal, plastic or other suitable material known in the art, to allow this alternate design of the notched washer 50 of FIG. 4 to be firmly pressed against the interior side 38 of the wall 14.

Figure 5:
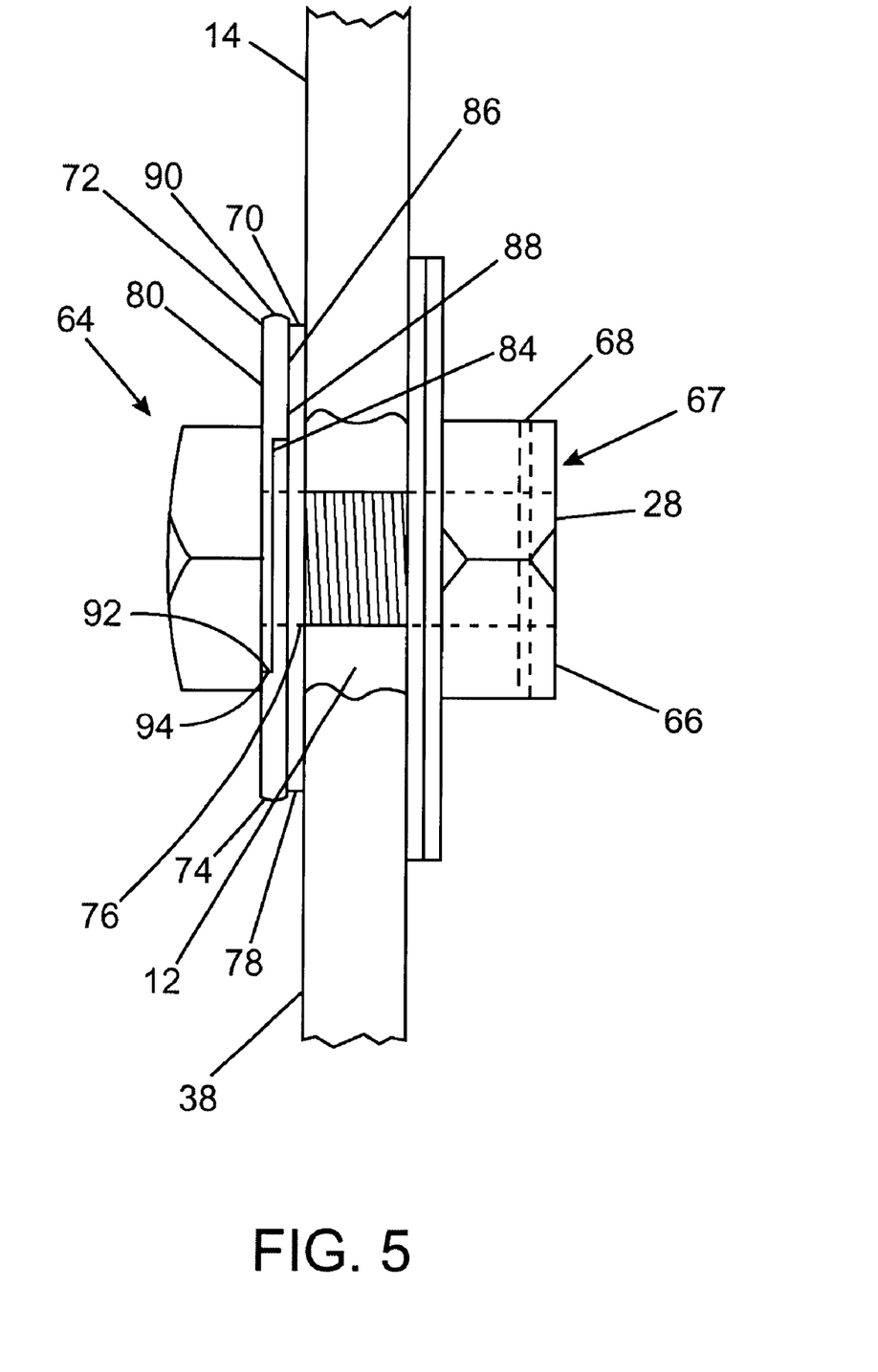
FIG. 5 is a side view of an alternate preferred embodiment of the present invention and depicts a locking nut, an interior sealing washer and a pair of multi-plane washers.

Referring now to FIG. 5, a second embodiment of the present invention, or locking hole plug 64, is presented. The locking hole plug 64 is shown fully attached to the wall 14 and sealing a hole 12. The locking nut 66 is shown attached to the threaded shank 28 to secure the locking hole plug 64 to the wall 14 and inhibit removal thereof. The locking element 67 comprises a teflon band 68 of the locking nut 66 which inhibits or impedes the removal of the locking nut 66 by increasing the amount of force required to turn the locking nut 66 about the threaded shank 28. Certain alternate preferred embodiments of the present invention comprise a jamming flange of a locking nut or a separated locking washer as the locking element or other forms known in the art.

The threaded shank 28 has been shortened after insulation by sawing or cutting any portion, not shown, of the threaded shank 28 that extends past the locking nut 66 after installation of the locking nut 66 onto the threaded shank 28 has been completed. This removal reduces the potential for inadvertent snagging of equipment or personnel that would later pass in close proximity to the hole plug 10.

FIG. 5 further depicts the external sealing washer 24 and an internal sealing washer 70. In the installation of the locking plug 64, the internal sealing washer 70 is inserted through the hole 12 and is pressed by a pair of multi-plane notched washers 72, 74 against the interior side 38 of the wall 14. The external sealing washer 24 is pressed against the exterior side 40 of the wall 14 by the exterior pressure washer 22.

The internal sealing washer 70 is passed through the hole 12 during installation of the locking hole plug 64. The internal sealing washer 70 is made of a strong and flexible material such as natural or synthetic rubber, neoprene or other suitable material known in the art. The internal sealing washer 70 is flexible enough to deform and pass through the hole 12 during installation of the locking hole plug 66 and to establish a sufficiently tight seal when the internal sealing washer 70 is then firmly driven against the interior side 38 of the wall 14. The internal sealing washer 70 has an opening 76 and an outward perimeter 78. The opening 76 snugly fits around the threaded shank 28 and allows translation of the internal sealing washer 70 along the threaded shank 28.

Certain alternate preferred embodiments of the present invention do not include the external sealing washer 24 and seal the hole 12 by the positioning of the internal sealing washer 70 against the interior side 38 of the wall 14 alone.

The locking hole plug 64 of FIG. 5 also includes a pair of multi-plane washers 72, 74. Each of the multi-plane washers 72, 74 has a back surface 80, an intermediate surface 84 and a raised surface 86. The raised surface 86 of the first washer 72 and the back surface 80 of the second washer 74 combine together to form a uniform pressure surface plane 88 that presses against either the internal sealing washer 70, or directly against the interior side 38 of the wall 14. When the locking hole plug 64 is fully installed, the multi-plane washers 72, 74 are combined so that the intermediate surface 84 of one washer 72 presses against the intermediate surface 84 of the matching multi-plane washer 74. The resulting physical registration of the multi-plane washers 72, 74 provides for the stabilized formation of the uniform pressure surface plane 88.

It is noted that alternate embodiments of the notched multi-plane washer 72, 74 are designed to be used in combination with one or more notched washers 20 of FIG. 1, and include a back surface 80, a raised surface 86 and an intermediate surface 84. The intermediate surface 84 is positioned to press against the back surface 80 of the notched washer or washers 20, 50 and to stabilize the combination of the multi-plane washer 72, 74 and the notched washer or washers 20, 50. Alternately, the washers may have more than one intermediate surface.

It is further noted that the use of one or two multi-plane washers 72, 74 in certain preferred embodiments of the present invention may require that the circumference 90 of one or more of the multi-plane washers 72, 74 be extended, whereby the one or more multi-plane washers 72, 74 may require a slightly larger size hole 12 for insertion than would be required for the insertion of notched washer 20 of FIG. 1 or of the alternate notched washer 50 of FIG. 3. Alternately, the use of multi-plane washers 72, 74 optionally with one or more notched washers 20 and/or one or more alternate notched washers 50 in a combined set of three or more washers 20, 50, 72, 74 may allow the use of individual notched or multi-plane washers 20, 50, 72, 74 of smaller maximum surface area, and thereby reduce the required magnitude of the hole 12.

Figure 6:
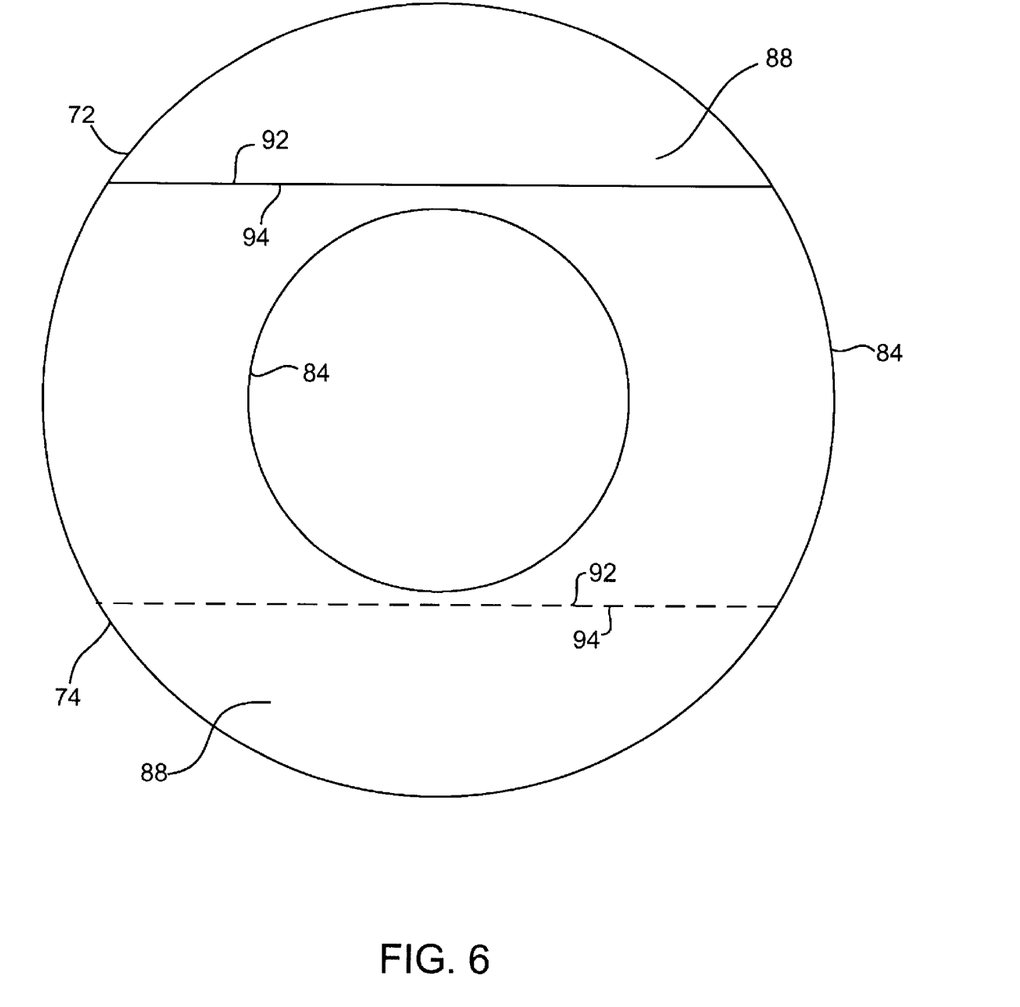
FIG. 6 is a front view of the notched multi-plane washers of FIG. 5.

Referring now to FIG. 6, a front view of the two notched multi-plane washers 72, 74 is shown where each intermediate surface 84 is simultaneously pressing the intermediate surface 84 of the neighboring multi-plane washer 72, 74 to form the uniform pressure surface plane 88. An outer face 92 of each multi-plane washer 72, 74 individually abuts against the inner face 94 of the other multi-plane washer 72, 74.

Figure 7A:
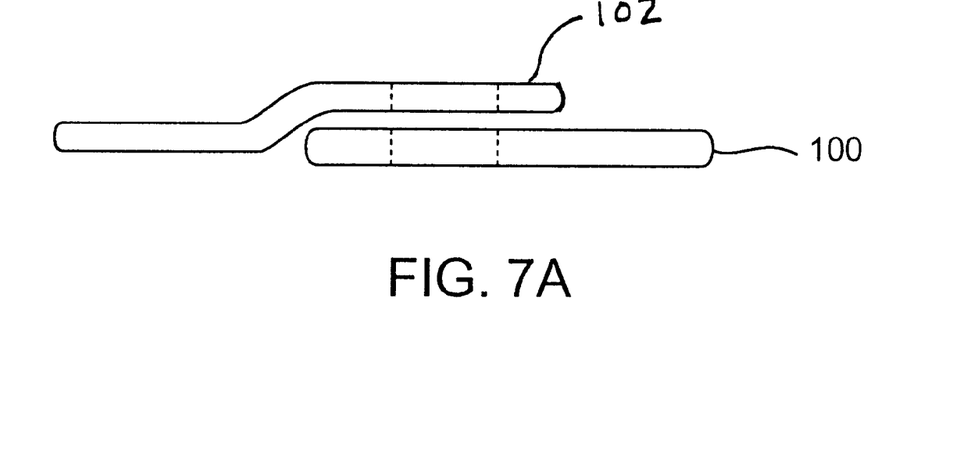
FIG. 7A is a side view of a crimped version of the washers.
Figure 7B:
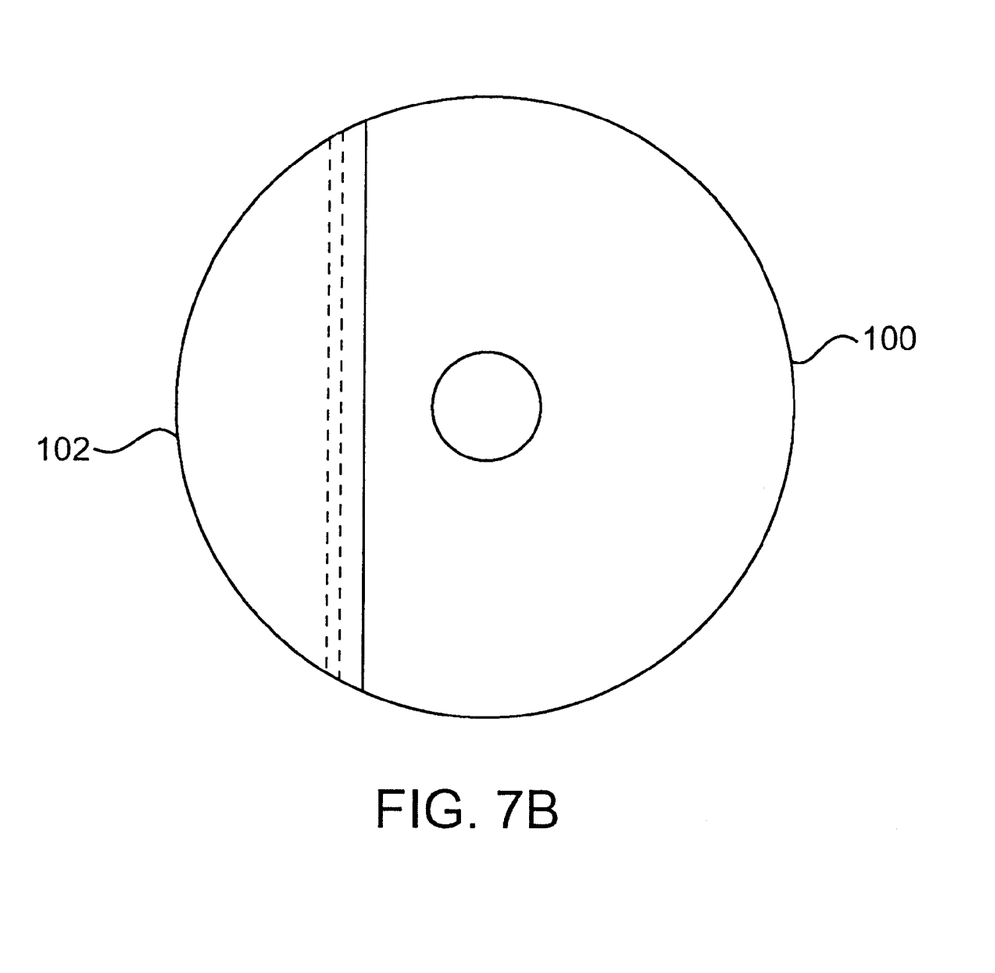
FIG. 7B is a front view of the crimped washers of FIG. 7A.

FIG. 7A is a side view and FIG. 7B is a front view of an alternate version of the washers 100, 102. The first washer 100 is flat and has a chordal portion removed from one side. The second washer 102, which also has a chordal portion removed from one side, is crimped or otherwise bent to engage the first washer 100. Since the washers 100, 102 will automatically twist and lock into the proper configuration, the alignment tooth 54 and holes 56 may be omitted, if desired.

FIGS. 8A–E show alternate versions of the hole plug in which a D-shaped bolt head 104 acts as one of the washers. In FIGS. 8A, 8B, 8D and 8E, the shank 122 of the bolt is not threaded.

Figure 8A:
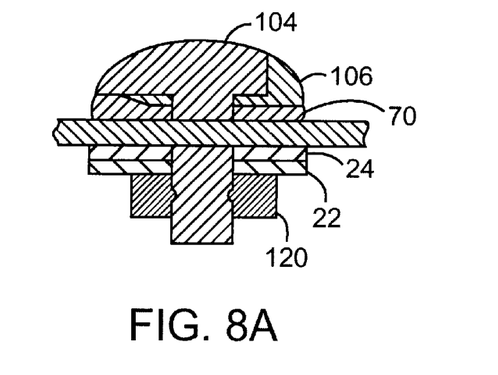
FIGS. 8A–E are cross-sectional and side views of alternate version of the bolt using a D-shaped bolt head.
Figure 8B:
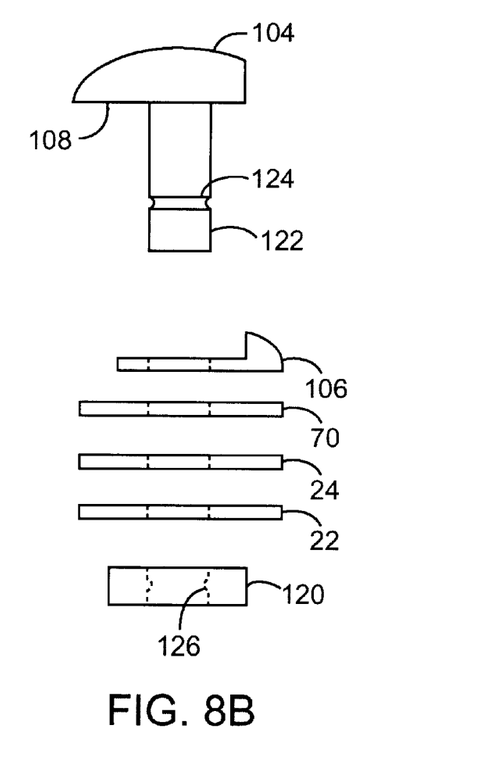
Figure 8C:
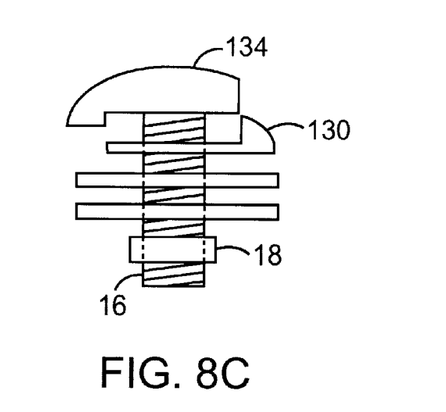
Figure 8D:
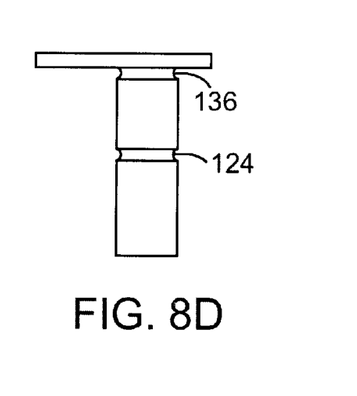
Figure 8E:
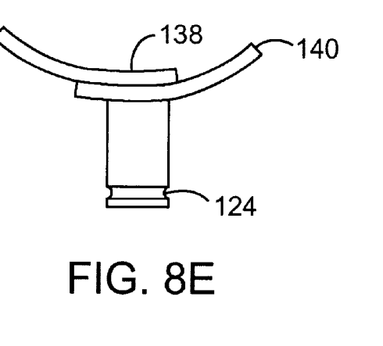

In these embodiments, the shank of the bolt may be round or the shank may be oval or other non-round shape or have a tooth or keyway to engage a nut having a mating shape. These non-round configurations would guarantee that the washer 106 would be in the correct position to form the full surface without any extra effort to fan out the parts. The connection to the nut 120 is formed by a snap together connection created by a projection 126 on the internal surface of the nut 120 engaging a depression 124 around the periphery of the shank 122. This connection or any other suitable connection means may be substituted in any of the embodiments to create a connection between the shank and the nut, for example the depression may be in the nut and the projection on the shank. In these embodiments, the surface 108 of the bolt head 104 adjacent the shank 122 is configured to mate with a washer 106. Once the washer 106 is added, the combination of the bolt head 104 and the washer form the pressure surface to press against the internal sealing washer 70 or the surface of the wall 14. If desired, an external sealing washer 22 may also be used. FIG. 8D shows a bolt with a smooth shank that has two depressions, the upper depression 136 engages the washer to help lock the washer in place, while the lower depression 124 engages the nut. In this embodiment, the shank has additional length to make manipulation of the bolt easier. Once the hole plug is assembled, the extra portion of the shank may be cut off. FIG. 8E shows a bolt with a curved bolt head 138 and a curved washer 140. The curved embodiment may be useful in cases where the surface being patched is not flat or where the bolt head and washer are used to maintain the curvature of a flexible structure. For example, if the curved wall of a cylindrical tank were being patched, the face of the washers may be curved so that, when in place, the curved face washers will press evenly against the wall of the tank. Other shapes, such as compound curves, angles, bends, or any other practical or desirable shape, are also envisioned. The bolt head 138 and washer 140 may even be formed of a somewhat resilient material so that it may conform to the shape of the body being plugged. In FIGS. 8D and 8E, the head of the D-shaped bolt is flat to decrease the amount the hole plug extends into the body being plugged. These embodiments may be especially useful for small-scale applications such as patching holes in human or animal tissue. If used in medical application the hole plug may be used to seal a hole either permanently or temporarily while the normal healing process takes place. For medical applications, biocompatible material should be used. In FIG. 8C, a threaded shank and multi-plane, D-shaped bolt head 134 are used with a multi-plane washer 130 to create a uniform pressure surface plane as described above in FIGS. 5 and 6.

Figure 9:
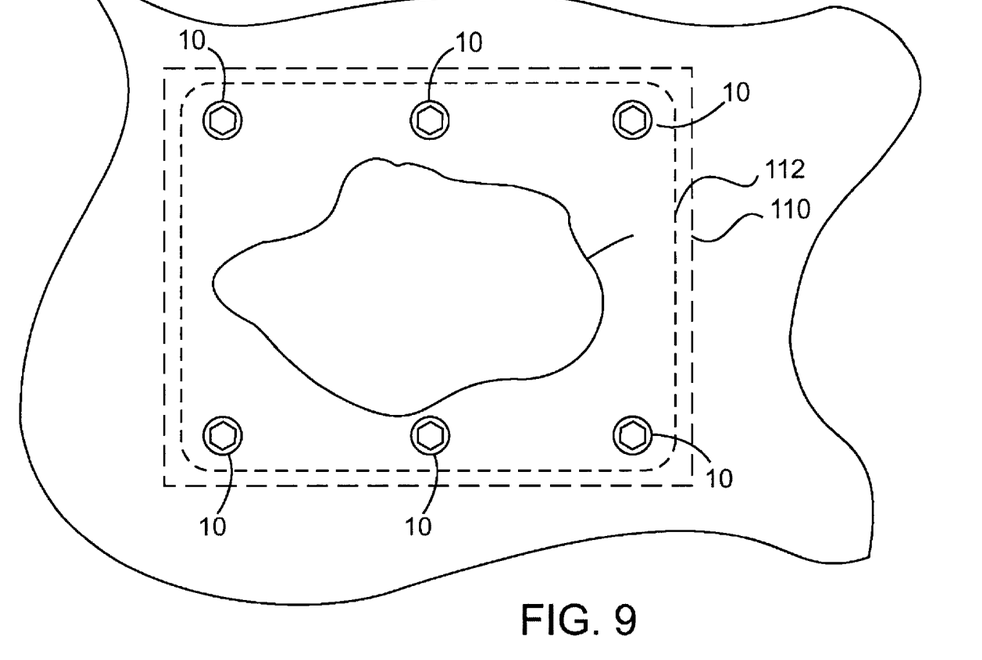
FIG. 9 is a front view of a plurality of hole plugs attaching a plate to seal a large hole.

Alternately, a large hole may be patched by using a plate 110 or other large member to cover the hole, then clamping the plate 110 into place using a plurality of hole plugs 10 as shown in FIG. 9. In this case, a large sealing washer 112 may be used between the plate 110 and the sidewalls around the hole 114.

In alternate applications, the scale of the parts of the hole plug 10 may be varied significantly. For example, in patching a large tank, the washer could be several feet in diameter.

In this case, large equipment may be required to assist in the proper placement and tightening of the hole plug 10. Smaller scale version may also be desired. For example as stated above, the same style members may be used in medical applications.

The hole plug 10 may also be used with other patch or repair methods. For example, it may be advantageous to use the present invention to clamp down patch material which is being epoxied or otherwise adhered to the wall material while the adhesive or other sealant is curing.

Many features have been listed with particular configurations, options, and embodiments. Any one or more of the features described may be added to or combined with any of the other embodiments or other standard devices to create alternate combinations and embodiments. Therefore, it is noted that various preferred embodiments of the present invention employ differing combinations of the optional and necessary components of the present invention. For example, either or both of the sealing washers 24, 70 may be used in combination with any of the various notched or unnotched washers.

Those skilled in the art will appreciate that various adaptations and modifications of the just-described preferred embodiments can be configured without departing from the scope and spirit of the invention. For example, if a large nut were used, the exterior washer could be omitted. Therefore, it is to be understood that, within the scope of the appended claims, the invention may be practiced other than as specifically described herein.

What is claimed is:

1. A hole plug used for sealing a hole in a wall, the wall having a first side and a second side, said hole plug comprising:
    a bolt having a D-shaped bolt head and a threaded shank, said bolt head having a clamping surface adjacent to said threaded shank, said clamping surface extending laterally outward from an axis of said threaded shank,
    a D-shaped washer having an internal aperture and a periphery, said internal aperture dimensioned to receive said threaded shank and to inhibit passage of said bolt head,
    a sealing washer having an opening and an outer perimeter, said opening adapted to receive said threaded shank, and said outer perimeter dimensioned to extend beyond the hole,
    and a threaded nut sized and configured to threadably engage said threaded shank,
    wherein said threaded shank passes through said internal aperture of said D-shaped washer and said opening of said sealing washer,
    and wherein said D-shaped washer and said sealing washer are located between said clamping surface and said threaded nut.

2. The hole plug of claim 1, further comprising an exterior washer having a central aperture and an external perimeter, said central aperture adapted to receive said threaded shank and said external perimeter dimensioned to inhibit passage of said exterior washer through the hole and wherein said threaded nut presses against said exterior washer.

3. The hole plug of claim 1 wherein said sealing washer is an internal sealing washer, said internal sealing washer being located about said threaded shank and between said D-shaped washer and said threaded nut, whereby said D-shaped washer and said D-shaped bolt head press against said internal sealing washer.

4. The hole plug of claim 3 further comprising an external sealing washer, said external sealing washer comprising a opening and an out side perimeter, said external sealing washer placed about said threaded shank and between said internal sealing washer and said threaded nut, said opening dimensioned to receive said threaded shank and said outside perimeter adapted to extend beyond the hole, whereby said threaded nut presses against said external sealing washer.

5. The hole plug of claim 1 wherein said sealing washer is an external sealing washer, said external sealing washer being located about said threaded shank and between said D-shaped washer and said threaded nut, whereby said threaded nut presses against said external sealing washer.

6. The hole plug of claim 1, wherein said opening of said sealing washer is dimensioned to snugly fit about said threaded shank.

7. The hole plug of claim 6, wherein said sealing washer is formed of a material chosen from the group of materials consisting of natural rubber, synthetic rubber, neoprene and plastic.

8. The hole plug of claim 1, wherein said bolt further comprises an alignment tooth, and said D-shaped washer includes an alignment receiver, said alignment receiver sized and configured to receive said alignment tooth.

9. The hole plug of claim 1, wherein said D-shaped bolt head is a D-shaped, multi-plane bolt head, wherein said D-shaped washer is a D-shaped, multi-plane washer, and wherein:

A said multi-plane bolt head comprising a first back surface, a first intermediate surface, a first raised surface, a first inner face extending from said back surface to said intermediate surface, and a first outer face extending from said first intermediate surface to said raised surface;

said multi-plane washer comprising a second back surface, a second intermediate surface, a second raised surface, a second outer face extending from said second back surface to said intermediate surface and a second inner face extending from said intermediate surface to said second raised surface; and said first intermediate surface pressing against said second intermediate surface, whereby one of said first raised surface and said second raised surface combine with one of said first back surface and said second back surface to form a uniform pressure surface plane.

10. The hole plug of claim 1, wherein said D-shaped bolt head is a D-shaped, multi-plane bolt head, and wherein said D-shaped washer is a D-shaped, multi-plane washer, and each of said multi-plane bolt head and said multi-plane washer comprising:

a first back surface, a first intermediate surface, a first raised surface, and a second intermediate surface;

wherein said first intermediate surface of said multi-plane bolt head abuts said second intermediate surface of said multi-plane washer and said second intermediate surface of said multi-plane bolt head abuts said first intermediate surface of said multi-plane washer;

whereby one of said raised surfaces combines with one of said back surfaces to form a uniform pressure surface plane.

11. The hole plug of claim 1 wherein the periphery of said D-shaped washers have a generally flat side and an arc-shaped portion having a first end and a second end, said generally flat side connecting said first and second ends of said arc-shaped portion.

12. The hole plug of claim 11 wherein said internal aperture and said arc-shaped portion are concentric in each of said D-shaped washers.

13. The hole plug of claim 1 wherein said D-shaped washers are independently rotatable around an axis defined by said threaded shank.

14. A hole plug used for sealing a hole in a wall, the wall having a first side and a second side, said hole plug comprising:

a shank having a D-shaped head member attached to one end thereof, said D-shaped head member having a clamping surface adjacent to said shank, said clamping surface extending laterally outward from an axis of said shank, a D-shaped washer having an internal aperture and a periphery, said internal aperture dimensioned to receive said shank and to inhibit passage of said D-shaped head member, a sealing washer having an opening and an outer perimeter, said opening adapted to receive said shank, and said outer perimeter dimensioned to extend beyond the hole, and a nut sized and configured to engage said shank, wherein said shank passes through said internal aperture of said D-shaped washer and said opening of said sealing washer, and wherein said D-shaped washer and said sealing washer are located between said clamping surface and said nut.

15. The hole plug of claim 14 wherein said nut releasably engages said shank.

16. The hole plug of claim 14 wherein said shank connects to said nut with a snap together connection.

17. The hole plug of claim 14 wherein a cross-section of said shank is a non-round shape.

18. The hole plug of claim 14 wherein said shank is oval.

19. A method of plugging a hole in a wall of a pipeline, a tank or a physical structure, the wall comprising a first side and a second side, and said method comprising the steps of;

a. identifying the hole to be plugged;

b. passing a shank of a bolt through an aperture of a D-shaped washer;

c. passing a shank of said bolt through a sealing washer;

d. passing a D-shaped head of said bolt through the hole from the second side to the first side of the wall;

e. passing a corner of said D-shaped washer through the hole from the second side to the first side of the wall;

f. rotating said D-shaped washer through the hole;

g. fanning out said D-shaped bolt head and said D-shaped washers to create a surface having a periphery, where said periphery extends beyond the periphery of the hole; and j. connecting a nut to said shank, thereby firmly pressing said sealing washer against the wall, thereby plugging the hole.

20. The method of claim 19, further comprising the step of preparing the hole such that the material of the wall surrounding the hole is solid.

21. The method of claim 19, further comprising the step of preparing the hole in a teardrop shape.

22. The method of claim 19, further comprising the step of applying an adhesive substance to said nut after said sealing washer is firmly pressed against said exterior side, whereby said nut is adhered in place and removal of said nut is impeded.

23. The method of claim 19, further comprising the step of passing said shank of said bolt through an external washer prior to step (h).

* * * * *